US00RE34148E

United States Patent [19]

Terauchi et al.

[11] E Patent Number: Re. 34,148

[45] Reissued Date of Patent: Dec. 22, 1992

[54] SCROLL TYPE COMPRESSOR WITH VARIABLE DISPLACEMENT MECHANISM

[75] Inventors: Kiyoshi Terauchi; Atsushi Mabe, both of Gunma, Japan

[73] Assignee: Sanden Corporation, Gunma, Japan

[21] Appl. No.: 522,058

[22] Filed: May 10, 1990

Related U.S. Patent Documents

Reissue of:

[64] Patent No.: 4,744,733
Issued: May 17, 1988
Appl. No.: 875,561
Filed: Jun. 18, 1986

[30] Foreign Application Priority Data

Jun. 18, 1985 [JP] Japan ..... 60-132487

[51] Int. Cl.[5] ..... F04B 49/02; F04B 49/08

[52] U.S. Cl. ..... 417/310; 417/440; 418/55.1

[58] Field of Search ..... 418/55.1; 417/295, 310, 417/440

[56] References Cited

U.S. PATENT DOCUMENTS

| | | | |
|---|---|---|---|
| 3,759,057 | 9/1973 | English | 417/440 |
| 4,459,817 | 7/1984 | Inagaki et al. | 417/310 |
| 4,468,178 | 8/1984 | Hiraga et al. | 418/55.1 |
| 4,505,651 | 3/1985 | Terauchi et al. | 417/440 |
| 4,557,670 | 12/1985 | Inagaki et al. | 417/310 |
| 4,642,034 | 2/1987 | Terauchi | 417/295 |

FOREIGN PATENT DOCUMENTS

| | | | |
|---|---|---|---|
| 101295 | 6/1985 | Japan | 417/295 |

*Primary Examiner*—Leonard E. Smith
*Attorney, Agent, or Firm*—Banner, Birch McKie & Beckett

[57] ABSTRACT

A variable displacement type compressor is disclosed. The compressor includes a housing having fluid inlet and fluid outlet ports. A fixed scroll is fixed within the housing and has a circular end plate from which a first spiral element extends. The end plate of the fixed scroll partitions the inner chamber of the compressor housing into a front chamber connected to the fluid inlet port and a rear chamber. The rear chamber is divided into a discharge chamber connected to the fluid outlet port and an intermediate pressure chamber. The end plate of the fixed scroll has at least two holes which connect the fluid pockets to the intermediate pressure chamber. The end plate also has a communicating channel which connects the front chamber to the intermediate chamber. A control device controls the communication between the front chamber and intermediate pressure chamber. The control device is disposed on the intermediate pressure chamber, and a valve element of the control means is operated by pressure from the discharge chamber.

20 Claims, 3 Drawing Sheets

SCROLL TYPE COMPRESSOR WITH VARIABLE DISPLACEMENT MECHANISM

Matter enclosed in heavy brackets [ ] appears in the original patent but forms no part of this reissue specification; matter printed in italics indicates the additions made by reissue.

TECHNICAL FIELD

The present invention relates to a scroll type compressor. More particularly, the present invention relates to a scroll type compressor with a variable displacement mechanism.

BACKGROUND OF THE INVENTION

When the air conditioning load in the compartment of a car is decreased by an air conditioning system, or the temperature in the compartment of the car is below the predetermined temperature, the displacement of the compressor, and therefore the compression ratio of the compressor, can be decreased.

A scroll type compressor which can vary the compression ratio is well known in the art. For example, U.S. Pat. No. 4,505,651 and U.S. Pat. No. 4,642,034 show such compressors.

However, in U.S. Pat. No. 4,505,651, the compression ratio change is not sufficient. Also, in the mechanism shown in U.S. Pat. No. 4,642,034, the temperature of the discharge fluid increases abnormally when the compressor operates at high speeds.

SUMMARY OF THE INVENTION

It is a primary object of the present invention to provide a scroll type compressor with a variable displacement mechanism which can continuously vary compressor displacement as the load changes or as the rotational speed of the compressor varies.

It is another object of the present invention to provide a scroll type compressor with a variable displacement mechanism which can vary the compression volume over a large range.

It is still another object of the present invention to provide a scroll type compressor with a variable displacement mechanism which eliminates suction pressure loss and which does not increase the temperature of the discharged fluid.

A scroll type compressor according to the present invention includes a housing having a inlet port and an outlet port. A fixed scroll is fixedly disposed with the housing and has a circular end plate from which a first spiral element extends. An orbiting scroll having a circular end plate from which a second spiral element extends is placed on a drive shaft. The two spiral elements interfit at an angular and radial offset to form a plurality of line contacts and to define at least one pair of fluid pockets within the interior of the housing. A driving mechanism is operatively connected to the orbiting scroll to effect orbital motion of the orbiting scroll and to change the volume of the fluid pockets during orbital motion. A rotation preventing mechanism prevents rotation of the orbiting scroll. The circular end plate of the fixed scroll divides the interior of the housing into a front chamber and a rear chamber. The front chamber communicates with a fluid inlet port. The rear chamber is divided into a discharge chamber which communicates with a fluid outlet port and a central fluid pocket formed by both scrolls, and an intermediate pressure chamber. At least one pair of holes is formed through the circular end plate of the fixed scroll to form a fluid channel between the fluid pockets and the intermediate pressure chamber. A communicating channel formed through the circular end plate of the fixed scroll provides a fluid channel between the intermediate pressure chamber and the front chamber. Control means disposed on a portion of the intermediate pressure chamber controls opening and closing of the communicating channel. A valve element of the control device is controlled by the compressed fluid in the discharge chamber.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION OF PREFERRED EMBODIMENTS

Figure 1:
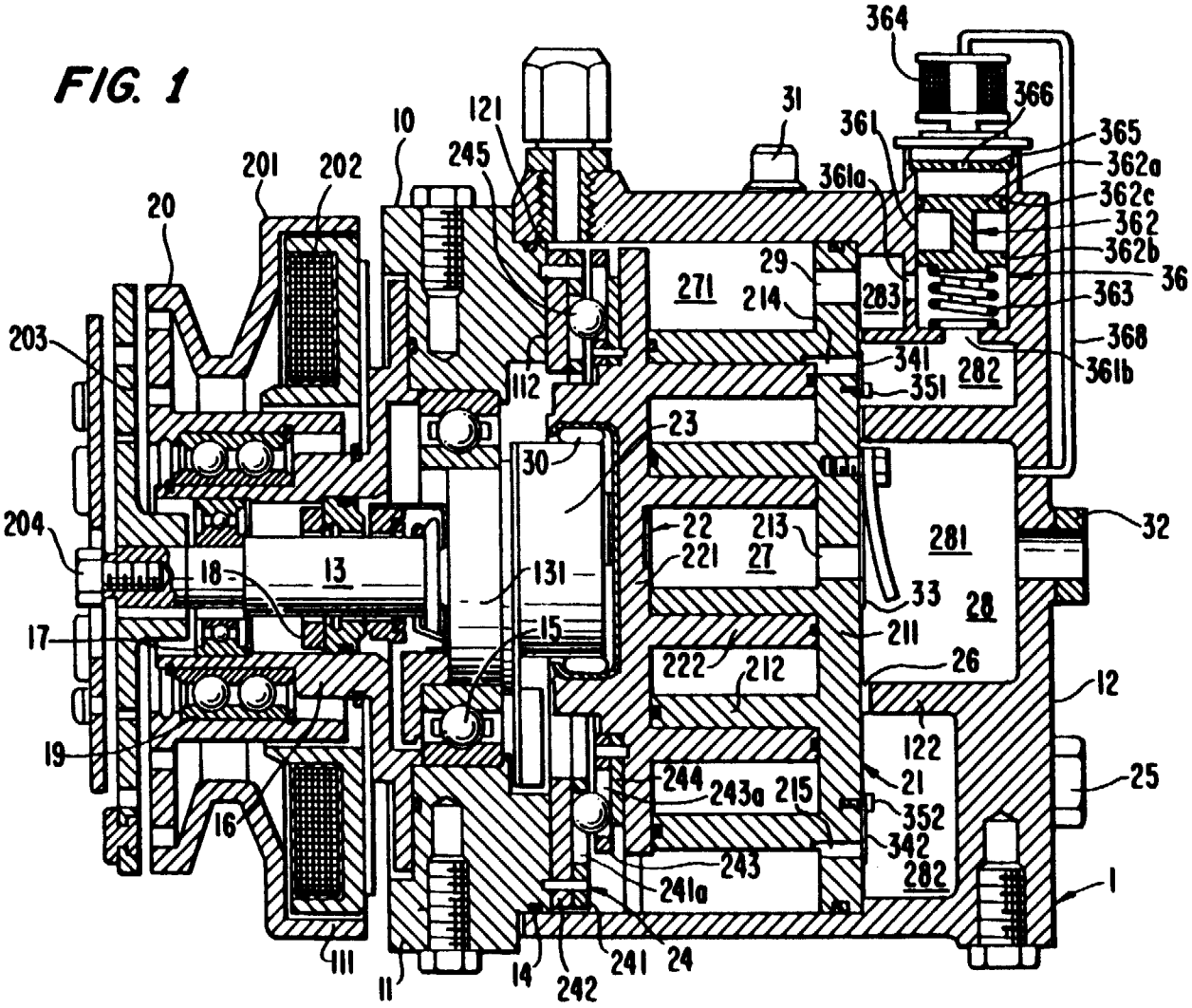
FIG. 1 is a vertical cross-sectional view of a scroll type compressor according to one embodiment of this invention.

Referring to FIG. 1, a scroll type compressor according to one embodiment of this invention is shown. The scroll type compressor includes a compressor housing 10 having front end plate 11 and cup-shaped casing 12 which is attached to an end surface of end plate 11. Opening 111 is formed in the center of front end plate 11 and drive shaft 13 is disposed in opening 111. Annular projection 112 is formed in a rear surface of front end plate 11. Annular projection 112 faces cup-shaped casing 12 and is concentric with opening 111. An outer peripheral surface of projection 112 extends into an inner wall of the opening of cup-shaped shaped casing 12. Opening 121 of cup-shaped casing 12 is covered by front end plate 11. O-ring 14 is placed between the outer peripheral surface of annular projection 112 and the inner wall of the opening of cup shaped casing 12 to seal the mating surfaces of front end plate 11 and cup-shaped casing 12.

Annular sleeve 16 projects from the front end surface of front end plate 11, surrounds drive shaft 13, and defines a shaft seal cavity. In the embodiment shown in FIG. 1, sleeve 16 is formed separately from front end plate 11. Sleeve 16 is fixed to the front end surface of front end plate 11 by screws (not shown). Alternatively, sleeve 16 may be formed integrally with front end plate 11.

Drive shaft 13 is rotatably supported by sleeve 16 through bearing 17 located within the front end of sleeve 16. Drive shaft 13 has disk-shaped rotor 131 at its inner end which is rotatably supported by front end plate 11 through bearing 15 located within opening 111 of front end plate 11. Shaft seal assembly 18 is coupled to drive shaft 13 within the shaft seal cavity of sleeve 16.

Pulley 201 is rotatably supported by ball bearing 19 which is carried on the outer surface of sleeve 16. Electromagnetic coil 202 is fixed about the outer surface of sleeve 16 by a support plate. Armature plate 203 is elastically supported on the outer end of drive shaft 13. Pulley 201, magnetic coil 202, and armature plate 203 form magnetic clutch 20. In operation, drive shaft 13 is driven by an external power source, for example, the engine of an automobile, through a rotation transmitting device such as magnetic clutch 20.

Fixed scroll 21, orbiting scroll 22, a driving mechanism for orbiting scroll 22, and rotation preventing/-thrust bearing mechanism 24 for orbiting scroll 22 are disposed in the interior of housing 10.

Fixed scroll 21 includes circular end plate 211 and spiral element 212 affixed to or extending from one end surface of circular end plate 211. Fixed scroll 21 is fixed within the inner chamber of cup-shaped casing 12 by screws 25 screwed into end plate 211 from the outside of cup-shaped casing 12. Circular end plate 211 of fixed scroll 21 partitions the inner chamber of cup-shaped casing 12 into two chambers, front chamber 27 and rear chamber 28. Spiral element 212 is located within front chamber 27.

Partition wall 122 axially projects from the inner end surface of cup-shaped casing 12. The end surface of partition wall 122 contacts the end surface of circular end plate 211. Thus, partition wall 122 divides rear chamber 28 into discharge chamber 281 formed at the center portion of rear chamber 21 and intermediate chamber 282. Gasket 26 may be disposed between the end surface of partition wall 122 and end plate 211 to secure the sealing.

Orbiting scroll 2, which is located in front chamber 27, includes circular end plate 221 and spiral element 222 extending from one end surface of circular end plate 221. Spiral element 222 of orbiting scroll 22 and spiral element 212 of fixed scroll 21 interfitting at an angular offset of 180° and a predetermined radial offset, form sealed spaces between spiral elements 212 and 222. Orbiting scroll 22 is rotatably supported by bushing 23, which is eccentrically connected to the inner end of disc-shaped portion 131 through radial needle bearing 20.

While orbiting scroll 22 orbits, rotation is prevented by rotation preventing/thrust bearing mechanism 24 which is placed between the inner end surface of front end plate 11 and circular end plate 221 of orbiting scroll 22. Rotation preventing/thrust bearing mechanism 24 includes fixed ring 241, fixed race 242, orbiting ring 243, orbiting race 244, and balls 245. Fixed ring 241 is attached to the inner end surface of front end plate 11 through fixed race 242 and has a plurality of circulate holes 241a. Orbiting ring 243 is attached to the rear end of orbiting scroll 22 through orbiting race 244 and has a plurality of circular holes 243a. Each ball 245 is placed between hole 241a of fixed ring 241 and circular hole 243a of orbiting ring 243, and moves along the edges of both circular holes 241a and 243a. Also, the axial thrust load from orbiting scroll 22 is supported on front end plate 11 through balls 245.

Compressor housing 10 is provided with inlet port 31 and outlet port 32 for connecting the compressor to an external refrigeration circuit. Refrigeration fluid from the external circuit is introduced into suction chamber 271 through inlet portion 31 and flows into sealed spaces formed between spiral elements 212 and 222 through open spaces between the spiral elements. The spaces between the spiral elements sequentially open and close during the orbital motion of orbiting scroll 22. When the spaces are open, fluid to be compressed flows into these spaces but no compression occurs. When the spaces are closed, no additional fluid flows into the spaces and compression begins. Since the location of the outer terminal ends of spiral elements 212 and 222 is at a final involute angle, location of the spaces is directly related to the final involute angle. Furthermore, refrigeration fluid in the sealed space is moved radially inwardly and is compressed by the orbital motion of orbiting scroll 22. Compressed refrigeration fluid at the center sealed space is discharged to discharge chamber 281 through discharge port 213, which is formed at the center of circular end plate 211.

Figure 2:
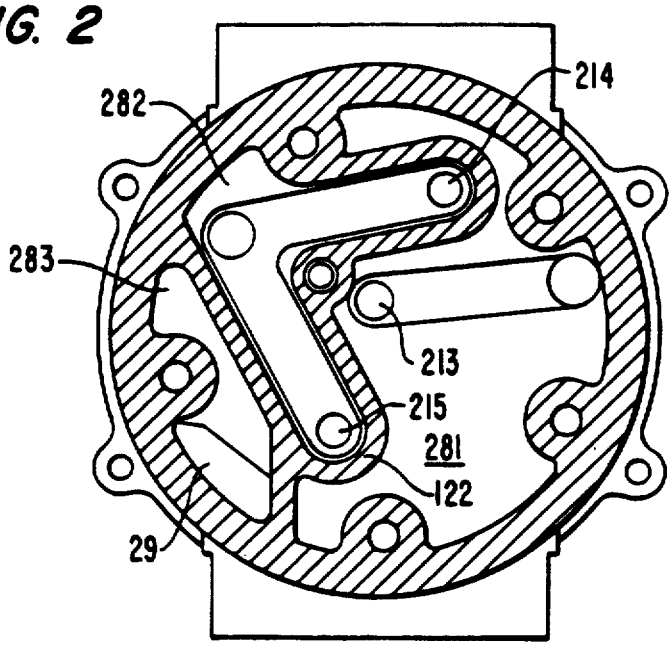
FIG. 2 is a sectional view of the compressor of FIG. 1 illustrating the position of the holes in the end plate.

Referring to FIGS. 1 and 2, a pair of holes 214, 215 are formed in end plate 211 of fixed scroll 21 and are symetrically placed so that an axial end surface of spiral element 222 of orbiting scroll 22 simultaneously crosses over both holes 214, 215. Holes 214 and 215 communicate between the sealed space and intermediate pressure chamber 282. Hole 214 is placed at a position defined by involute angle $\phi_1$ (not shown) and opens along the inner side wall of spiral element 212. The other hole 215 is placed at a position defined by involute angle ($\phi_1$-$\pi$) (not shown) and opens along the outer side wall of spiral element 212. A control device, such as valve member having valve plates 341, 342 is attached by fasteners 351, 352 to the end surface of end plate 211 opposite holes 214, 215, respectively. Each valve plate 341, 342 is made of a spring type material so that the bias of each valve plate 341, 342 pushes it against the opening of holes 214, 215 to close each hole.

End plate 211 of fixed scroll 21 also has communicating channel 29 at an outer side portion of the terminal end of spiral element 212. Communicating channel 29 connects section chamber 271 of front chamber 27 and intermediate pressure chamber 282 through communication chamber 283. Control mechanism 36 controls fluid communication between communication chamber 283 and intermediate pressure chamber 282. Control mechanism 36 includes cylinder 361, I-shaped piston 362 slidably disposed within cylinder 361, and coil spring 363 disposed between the lower end portion of piston 362 and the bottom portion of cylinder 361 to support piston 362. First opening 361a is formed on a side surface of cylinder 362 and creates a fluid path between cylinder 361 and communication chamber 283. Second opening 361b is formed on the bottom portion of cylinder 361 and creates a fluid path between cylinder 361 and intermediate pressure chamber 282. The upper portion of cylinder 361 is covered by plate 365 which is provided with aperture 366 at its center portion and is connected with discharge chamber 281 through capillary tube 368. Fluid communication between cylinder 361 and discharge chamber 281 is controlled by magnetic valve 364 disposed on housing 10. Piston ring 362c is placed on the upper portion of piston 362 to prevent the leakage of high pressure fluid between cylinder 361 and piston 362.

The operation of control mechanism 36 is as follows. When orbiting scroll 22 is operated by the rotation of drive shaft 13, refrigeration fluid flows into suction chamber 271 through inlet port 31 and then flows into sealed spaces (fluid pockets) defined between spiral elements 212 and 222. As the refrigeration fluid in the sealed spaces moves towards the center of spiral elements 212 and 222 its volume is reduced and it is compressed. The fluid is then discharged through discharge port 213 to discharge chamber 281.

When electromagnetic valve 364 is de-energized, there is no communication between discharge chamber 281 and cylinder 361. Piston 362 is urged upwardly by the recoil strength of spring 363, and the bottom portion 362b of piston 362 moves upwardly past first opening 361a. This connects intermediate pressure chamber 282 to communication chamber 283 through cylinder 361 and opening 361a. Therefore, intermediate pressure chamber 282 maintains the suction pressure level, and some refrigeration fluid in the fluid pockets flows into intermediate pressure chamber 282 through holes 214 and 215 and back into front chamber 27. Therefore, the compression phase of the compressor starts after the spiral element passes over holes 214 and 215. This greatly reduces the compression ratio of the compressor.

On the other hand, when electromagnetic valve 364 is energized, compressed fluid in discharge chamber 281 flows into cylinder 361 through capillary tube 368. As the recoil strength of spring 363 is selected to be less than the force of the compressed fluid, piston 362 is pushed downwardly by the compressed fluid. Second hole 361d which connects cylinder 361 with intermediate pressure chamber 282 is covered by piston 362 and this prevents communication between communication chamber 283 and intermediate pressure chamber 282. Therefore, the pressure in intermediate pressure chamber 282 gradually increases due to fluid passage from the fluid pockets through holes 214 and 215. This passage of compressed fluid continues until the pressure in intermediate pressure chamber 282 is equal to the pressure in the fluid pockets. When pressure equalization occurs, holes 214 and 215 are closed by the spring tension of valve plates 341 and 342. Compression then operates normally and the displacement volume of the sealed fluid pockets is the same as the displacement volume when the terminal end of each spiral element 212, 222 first contacts outer spirals 211, 221.

Figure 3:
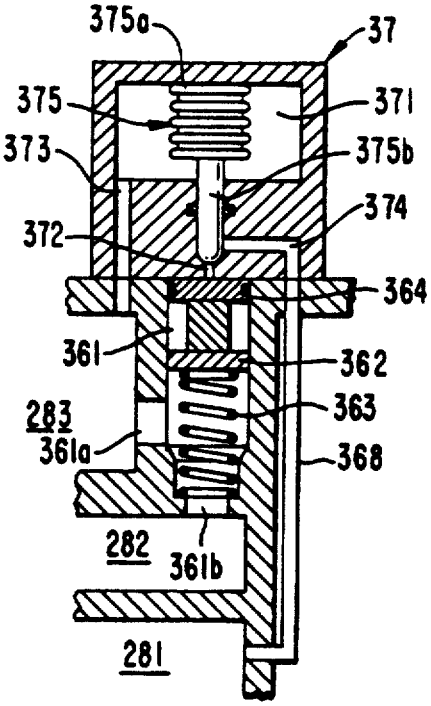
FIG. 3 is a cross-sectional view of an alternate embodiment of the variable displacement mechanism used in the scroll type compressor of FIG. 1.

Referring to FIG. 3, the second embodiment of a control mechanism is shown. The control mechanism includes cylinder 361, I-shaped piston 362 slidably disposed within cylinder 361, spring 363 disposed between the lower end surface of piston 362 and the bottom portion of cylinder 361, and control element 37. Intermediate pressure chamber 282, cylinder 361, and communicating chamber 283 are connected to one another through first and second openings 361a and 361b. The upper opening cylinder 361 is covered by the upper portion of control element 37 which is provided with operating chamber 371. The interior of operating chamber 371 is connected with cylinder 361 through first conduit 372 and is also connected with communicating chamber 283 through second conduit 373. The mid-portion of conduit 372 is connected to discharge chamber 281 through capillary tube 368 and connecting conduit 374. Bellows 375 is disposed in operating chamber 371 and comprises bellows portion 375a and valve portion 375b attached to the lower end of bellows portion 375a. Valve portion 375b is slidably disposed in aperture 372 and controls fluid communication between cylinder 361 and discharge chamber 281. During operation of the compressor, if the pressure in connecting chamber 283 decreases, the pressure in operating chamber 371 also decreases. When this occurs, if the pressure in bellows portion 375a is larger than the pressure in operating chamber 371, the fluid in bellows portion 375a expands and forces valve portion 375b downwardly to close the opening of conduit 372. This prevents communication between discharge chamber 281 and cylinder 361. Piston 362 is pushed upwardly by the bias of spring 363 and intermediate pressure chamber 282 communicates with cylinder 361. This reduces the compression ratio of the compressor in the manner described with respect to the compressor of FIG. 1.

On the other hand, if the pressure in operating chamber 371 increases and the pressure in bellows portion 375a is less than the pressure in operating chamber 371, the volume of the fluid in bellows portion 375a decreases. Thus, bellows portion 375a shrinks and valve portion 375b moves upwardly and opens conduit 372. Cylinder 361 is connected with discharge chamber 281 through conduit 372, connecting conduit 374, and capillary tube 368. Compressed fluid flows form discharge chamber 281 into cylinder 361 through capillarly tube 368. Because the pressure of the compressed fluid in discharge chamber 281 is selected to be stronger than the recoil strength of spring 363, piston 362 is pushed downwardly by the compressed fluid. Accordingly, intermediate pressure chamber 282 is disconnected from communicating chamber 283 and the compression ratio of the compressor increases. The moving distance of bellows portion 375a is determined by the fluid pressure in operating chamber 371. Accordingly, the operating valve portion 375b is set to the pressure in operating chamber 371.

When the air conditioning load is small, or the pressure in operating chamber 371 is less than the predetermined value as caused by an increased rotational speed of the compressor, bellows portion 375a moves downwardly, the moving distance of valve portion 375b is smaller, and the refrigeration fluid volume supplied to cylinder 361 decreases. Piston 362 is pushed upwardly by the bias of spring 363 and the area of opening 361a increases. This decreases pressure loss from the compressed fluid at opening 361a because the open area 361a of cylinder 361 is increased. Therefore, the compression ratio decreases, and the pressure in connecting chamber 283 is gradually increased.

When the fluid pressure in connecting chamber 283 is larger than the predetermined value, bellows portion 375a of bellows 375 shrinks, and the moving distance of valve portion 375b gradually increases. The volume of the compressed fluid supplied to cylinder 361 increases. Therefore, piston 362 is pushed downwardly by the fluid against the bias of spring 363. The open area of opening 361a of cylinder 361 gradually decreases, and the pressure in connecting chamber 382 also gradually decreases.

Figure 4:
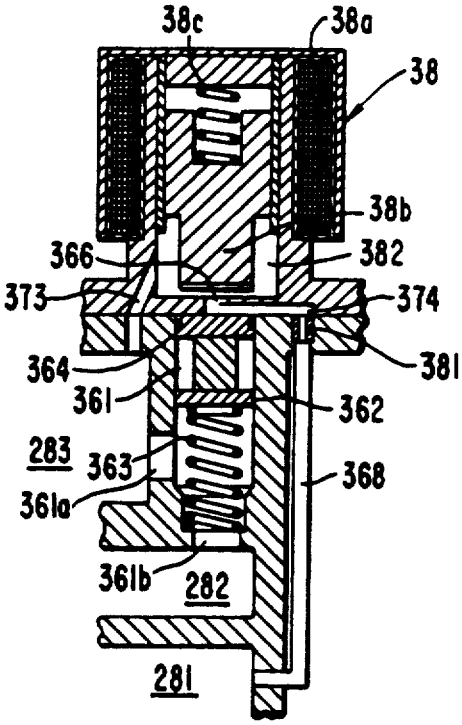
FIG. 4 is a cross-sectional view of another alternate embodiment of the variable displacement mechanism used in the scroll type compressor of FIG. 1.

Referring to FIG. 4, a third embodiment of the control mechanism is shown. Electromagnetic valve 38, which functions as the control mechanism, is disposed on the upper opening of cylinder 361 and comprises coil 38a, armature 38b, and spring 38c. Armature 38b is slidably fitted within the inner surface of coil 38a and pushes downwardly to close aperture 366. Aperture 366 is connected to discharge chamber 281 through connecting conduit 374, orifice 381, and capillary tube 368.

During operation of the compressor, a small amount of compressed fluid which is discharged from discharge chamber 281 is always supplied to the upper space of cylinder 361 through aperture 366. When coil 38a is not energized, the upper end of aperture 366 is closed by armature 38b. The pressure of the compressed fluid in cylinder 361 is larger than the recoil strength of spring 363, therefore, piston 362 moves downwardly to close openings 361a and 361b. Communication between intermediate chamber 282 and connecting chamber 283 is prevented, and the compression ratio of the compressor is normal.

When coil 38a is energized, a magnetic flux is produced around coil 38a and armature 38b is pulled up. Compressed fluid flows into operating chamber 382 through aperture 366. Piston 362 is pushed upwardly by the recoil strength of spring 363. Accordingly, communicating chamber 283 is connected with intermediate pressure chamber 282 through cylinder 361 and the compression volume decreases.

Figure 5:
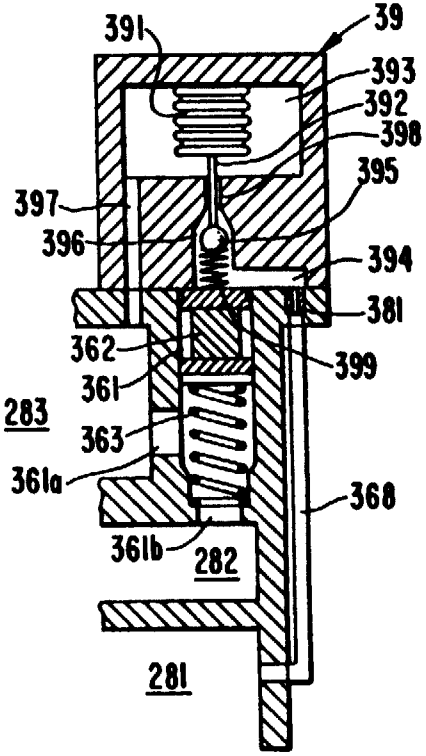
FIG. 5 is a cross-sectional view of another alternate embodiment of the variable displacement mechanism used in the scroll type compressor of FIG. 1.

Referring to FIG. 5, a fourth embodiment of the control mechanism is shown, Magnetic valve 38 of FIG. 4 is replaced by bellows valve element 39. Bellows valve element 39 includes bellows portions 391 disposed in first operating chamber 393 and needle portion 392 attached on the bottom surface of bellows portion 391. First operating chamber 393 is connected to connecting chamber 283 through conduit 397. Needle portion 392 slidably penetrates aperture 396 and extends into second operating chamber 394. Aperture 396 connects first and second operating chambers 393 and 394. Second operating chamber 394 is connected to cylinder 361 and discharge chamber 281 through capillary tube 368. Ball 395 is disposed on the top of spring 399 which is disposed in second operating chamber 394 and contacts the end of needle portion 392. Thus, ball 395 controls the opening and closing of aperture 396 by the recoil strength of spring 399 and the operation of bellows portion 391.

During operation of the compressor, a small amount of compressed fluid which is discharged from discharge chamber 281 is always supplied to second operating chamber 394 through orifice 381 and capillary tube 368. When the pressure in first operating chamber 393 is larger than that in bellows portion 391, bellows portion 391 shrinks. Ball 395, moved upwardly by the recoil strength of spring 399, pushes needle portion 392 upwardly and closes the opening of aperture 398. Piston 362 is pushed downwardly against spring 363 by the compressed fluid and closes 361b. Connecting chamber 283 is disconnected from intermediate pressure chamber 282, and the compression volume is increased. When the pressure in first operating chamber 393 is decreased and the pressure in bellows portions 391 is larger than the pressure in first operating chamber 393, bellows portion 391 expands. Needle portion 392 moves downwardly and pushes ball 395 against spring 399. Compressed fluid in second operating chamber 394 flows to first operating chamber 393 through aperture 396. Since the pressure in second operating chamber 394 is decreased, piston 362 moves upwardly by the force of spring 363. Accordingly, connecting chamber 283 is connected with intermediate pressure chamber 282 through cylinder 361 and openings 361a and 361b. Therefore, the compression volume is decreased.

Figure 6:
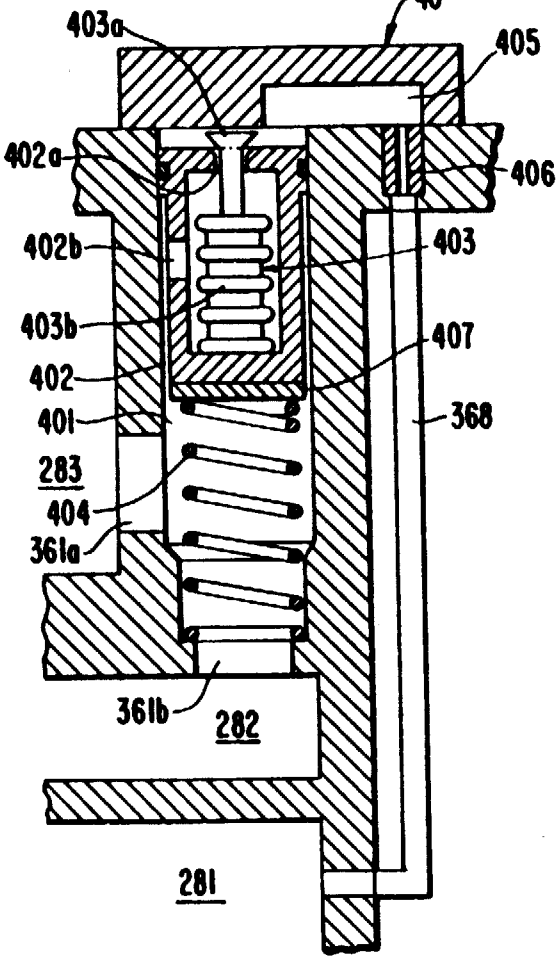
FIG. 6 is a cross-sectional view of another alternate embodiment of the variable displacement mechanism used in the scroll type compressor of FIG. 1.

Referring to FIG. 6, a fifth embodiment of the control mechanism is shown. Control mechanism 40 includes cylinder 401, piston valve 402, bellows 403, and spring 404. Piston valve 402 is slidably disposed within cylinder 401 and has openings 402a and 402b. Piston 402 is pushed upwardly by spring 404 disposed between the bottom portion of cylinder 401 and the lower end surface of piston 402. Bellows 403 is disposed in the interior of piston valve 402, and includes valve portion 403a and bellows portion 403b. Valve portion 403a extends to the outside of piston valve 402 through opening 402a which is formed on the upper portion of piston valve 402. Cylinder 401 is connected to discharge chamber 281 through conduits 405, 406, and capillary tube 368.

Since the interior of piston valve 402 is connected to connecting chamber 283 through opening 402b, cylinder 401, and opening 361a, if the pressure in connecting chamber 283 is less than the pressure of the fluid enclosed in bellows portion 403b, bellow portions 403b expands. Valve portion 403a opens opening 402a of piston valve 402, and a small amount of compressed fluid which is supplied to the top space of cylinder 401 from conduit 406 flows into communicating chamber 283 through piston valve 402 and cylinder 401. At this time, piston 407 which closes opening 361b, is pushed upwardly by the recoil strength of spring 404, and established communication between communicating chamber 263 and intermediate pressure chamber 282. Therefore, the compression ratio is decreased.

Figure 7:
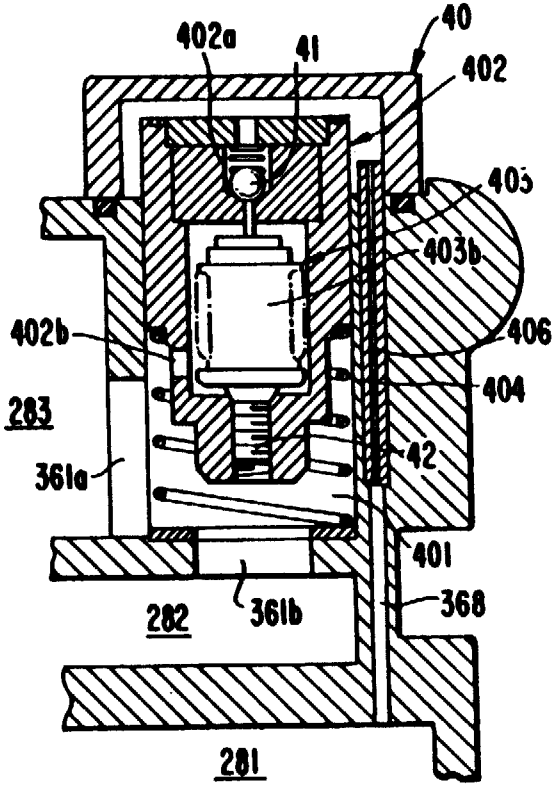
FIG. 7 is a cross-sectional view of another alternate embodiment of the variable displacement mechanism used in the scroll type compressor of FIG. 1.

On the other hand, if the pressure of fluid in communicating chamber 283 is larger than the pressure of the fluid in bellows portion 403b, bellows portion 403b contracts and opening 402a is closed by valve portion 403a. In this situation, a small amount of compressed fluid flows from discharge chamber 281 into the top space of cylinder 401, and piston valve 402 is pushed downwardly against the recoil strength of spring 404. Opening 361a and 361b are therefore closed by piston valve 402, and the compression ratio is increased. In this embodiment, the construction of valve portion 403a is a simple structure. However, a needle-ball type valve mechanism 41 may be used, as shown in FIG. 7. Also, the force caused by bellows portion 403b is controlled by the position of bellows 403, which, in turn, is determined by screw 42 screwed on the bottom portion of piston valve 402, as shown in FIG. 7. Needle-ball type valve mechanism 41, as shown in FIG. 7, uses elements similar to those of valve mechanism 40 of FIG. 6. Needle-ball type valve mechanism 41 is connected to discharge chamber 281 through conduit 406 and capillary tube 368. When the pressure in cylinder 401 is less than the pressure within bellows portion 403b, bellows portion 403b expands, needle-ball type valve mechanism 41 is pushed upwardly, and opening 402a of piston valve 402 is opened. Therefore, discharge chamber 281 is placed in fluid communication with the interior of piston valve 402 through conduit 406 and capillary tube 368.

When the pressure in cylinder 401 is greater than the pressure within bellows portion 403b, bellows portion 403b contracts and needle-ball type valve mechanism 41 is pushed downwardly and obstructs opening 402a of piston valve 402. Thus, discharge chamber 281 is not in fluid communication with the interior of piston valve 402, and the compressed fluid from the discharge chamber 281 acts on the upper end surface of piston valve 402 to push downwardly piston valve 402 against the recoil strength of spring 404. This obstructs communication between communicating chamber 283 and intermediate pressure chamber 282 and increases the compression ratio.

Numerous characteristics, advantages, and embodiments of the invention have been described in detail in the foregoing description with reference to the accompanying drawings. However, the disclosure is illustrative only and it is to be understood that the invention is not limited to the precise illustrated embodiments. Various changes and modifications may be effected therein by one skilled in the art without departing from the scope of spirit of the invention.

We claim:

1. In a scroll type compressor including a housing having an inlet port and an outlet port, a fixed scroll fixedly disposed within said housing and having a circular end plate from which a first spiral element extends into the interior of said housing, an orbiting scroll having a circular end plate from which a second spiral element extends, said first and second spiral elements interfitting at an angular and radial offset to make a plurality of line contacts and define at least one pair of fluid pockets within the interior of said housing, a driving mechanism operatively connected to said orbiting scroll to effect the orbital motion of said orbiting scroll, a rotation preventing mechanism for preventing the rotation of said orbiting scroll during the orbital motion, said circular end plate of said fixed scroll dividing the interior of said housing into a front chamber and a rear chamber, said front chamber communicating with said inlet port, and said rear chamber being divided into a discharge chamber which communicates between said outlet port and a central fluid pocket formed by both said scrolls and an intermediate pressure chamber, the improvement comprising:

at least one pair of holes formed through said circular end plate of said fixed scroll forming a fluid channel between the fluid pockets and said intermediate pressure chamber, a communication channel formed through said circular end plate of said fixed scroll to form a fluid channel between said intermediate pressure chamber and said front chamber, control means disposed on a portion of said intermediate pressure chamber for controlling fluid communication between said intermediate pressure chamber and said front chamber, said control means comprising a [valve element operated by the compressed fluid in said discharge chamber, and a] cylinder *connected with said intermediate pressure chamber, said front chamber and said discharge chamber*, a piston slidably disposed within said cylinder *and operated by the compressed fluid from said discharge chamber*, and a control valve element [, a top portion of said cylinder being connected to said discharge chamber, said control valve element] controlling the communication between said discharge chamber and said front chamber.

2. A scroll type compressor according to claim 1 wherein said *control* valve element is disposed in said piston.

*3. A scroll type compressor according to claim 1 wherein said control valve element comprises a bellows and a valve operated by said bellows, said piston including a first opening facing a portion of said cylinder in communication with said discharge chamber and a second opening facing a portion of said cylinder in communication with said front chamber, said bellows being located within said piston and being responsive to the pressure in said front chamber to operate said valve to open and close said first opening to thereby control communication between said discharge chamber and said front chamber.*

*4. A scroll type compressor according to claim 3 wherein a lower portion of said cylinder communicates with said intermediate pressure chamber and said front chamber, communication between said intermediate pressure chamber and said front chamber being controlled by the sliding operation of said piston, a top portion of said cylinder being connected with said discharge chamber.*

*5. A scroll type compressor according to claim 4 wherein the top portion of said cylinder and said discharge chamber are connected through a fluid channel including a constricted conduit disposed in a portion thereof.*

*6. A scroll type compressor according to claim 1 wherein a lower portion of said cylinder communicates with said intermediate pressure chamber and said front chamber, communication between said intermediate pressure chamber and said front chamber being controlled by the sliding operation of said piston, a top portion of said cylinder being connected with said discharge chamber.*

*7. A scroll type compressor according to claim 6 wherein said control valve element controls the sliding operation of said piston in response to the pressure in said front chamber to thereby control communication between said intermediate pressure chamber and said front chamber to vary the compression ratio of said compressor.*

*8. A scroll type compressor according to claim 7 wherein, in the event the pressure in said front chamber is less than a predetermined pressure, said control valve element opens communication between said discharge chamber and said front chamber and said piston slides upward in said cylinder to open communication between said intermediate pressure chamber and said front chamber to thereby decrease the compression ratio.*

*9. A scroll type compressor according to claim 8 wherein, in the event the pressure in said front chamber is greater than the predetermined pressure, said control valve element closes off communication between said discharge chamber and said front chamber and said piston slides downward in response to the pressure from said discharge chamber to close off communication between said intermediate pressure chamber and said front chamber to thereby increase the compression ratio.*

*10. In a scroll type compressor including a housing having an inlet port and an outlet port, a fixed scroll fixedly disposed within said housing and having a circular end plate from which a first spiral element extends into the interior of said housing, an orbiting scroll having a circular end plate from which a second spiral element extends, said first and second spiral elements interfitting at an angular and radial offset to make a plurality of line contacts and define at least one pair of fluid pockets within the interior of said housing, a driving mechanism operatively connected to said orbiting scroll to effect the orbital motion of said orbiting scroll, a rotation preventing mechanism for preventing the rotation of said orbiting scroll during the orbital motion, said circular end plate of said fixed scroll dividing the interior of said housing into a front chamber and a rear chamber, said front chamber communicating with said inlet port, and said rear chamber being divided into a discharge chamber which communicates between said outlet port and a central fluid pocket formed by both said scrolls and an intermediate pressure chamber, the improvement comprising:*

*at least one pair of holes formed through said circular end plate of said fixed scroll forming a fluid channel*

*between the fluid pockets and said intermediate pressure chamber, a communication chamber formed by a further division of said rear chamber, a communicating channel formed through said circular end plate of said fixed scroll forming a fluid channel between said front chamber and said communication chamber, a first opening formed through a wall of said communication chamber forming a fluid channel between said communication chamber and said intermediate pressure chamber and thereby forming a continuous fluid channel between said front chamber and said intermediate pressure chamber, control means disposed on a portion of said intermediate pressure chamber for controlling fluid communication between said intermediate pressure chamber and said front chamber, said control means comprising a cylinder including a top portion connected to said discharge chamber by a conduit for communicating fluid therebetween, a side portion connected to said wall of said communication chamber with said first opening formed therethrough for communicating fluid therebetween, and a bottom portion connected with said intermediate pressure chamber, a piston slidably disposed within said cylinder and operated by the compressed fluid from said discharge chamber, and a control valve element controlling the communication between said discharge chamber and said front chamber and operated by the compressed fluid from said communication chamber.*

*11. A scroll type compressor according to claim 10 wherein said control valve element is disposed in said piston.*

*12. In a scroll type compressor including a housing having an inlet port and an outlet port, a fixed scroll fixedly disposed within said housing and having a circular end plate from which a first spiral element extends into the interior of said housing, an orbiting scroll having a circular end plate from which a second spiral element extends, said first and second spiral elements interfitting at an angular and radial offset to make a plurality of line contacts and define at least one pair of fluid pockets within the interior of said housing, a driving mechanism operatively connected to said orbiting scroll to effect the orbital motion of said orbiting scroll, a rotation preventing mechanism for preventing the rotation of said orbiting scroll during the orbital motion, said circular end plate of said fixed scroll dividing the interior of said housing into a front chamber and a rear chamber, said front chamber communicating with said inlet port, and said rear chamber being divided into a discharge chamber which communicates between said outlet port and a central fluid pocket formed by both said scrolls and an intermediate pressure chamber, the improvement comprising:*

*at least one pair of holes formed through said circular end plate of said fixed scroll forming a fluid channel between the fluid pockets and said intermediate pressure chamber, a communication chamber formed by a further division of said rear chamber, a communicating channel formed through said circular end plate of said fixed scroll forming a fluid channel between said front chamber and said communication chamber, first control means disposed on a portion of said intermediate pressure chamber for controlling fluid communication between said communication chamber and said intermediate pressure chamber, conduit means connected between said first control means and said discharge chamber for communicating fluid therebetween, said first control means operated by the compressed fluid from said discharge chamber, second control means associated with said first control means for controlling fluid communication between said discharge chamber and said communication chamber, said second control means operated by changes of the fluid pressure in said communication chamber.*

*13. A scroll type compressor according to claim 12 wherein said first control means comprises a cylinder connected with said intermediate pressure chamber, said communication chamber and said conduit means, and a piston slidably disposed within said cylinder.*

*14. A scroll type compressor according to claim 12 wherein said conduit means comprises a fluid channel including a constricted conduit disposed in a portion thereof.*

*15. A scroll type compressor according to claim 13 wherein said second control means comprises a control valve element disposed in said piston.*

*16. A scroll type compressor according to claim 15 wherein said control valve element comprises a bellows and a valve operated by said bellows, said piston including a first opening facing a portion of said cylinder in communication with said conduit means and a second opening facing a portion of said cylinder in communication with said communication chamber, said bellows being responsive to the pressure in said communication chamber to operate said valve to open and close said first opening and thereby control communication between said discharge chamber and said front chamber.*

*17. A scroll type compressor according to claim 16 wherein a lower portion of said cylinder communicates with said intermediate pressure chamber and said communication chamber, communication between said intermediate pressure chamber and said communication chamber being controlled by the sliding operation of said piston, a top portion of said cylinder being connected with said conduit means.*

*18. A scroll type compressor according to claim 17 wherein said control valve element controls the sliding operation of said piston in response to the pressure in said communication chamber to thereby control communication between said intermediate pressure chamber and said communication chamber to vary the compression ratio of said compressor.*

*19. A scroll type compressor according to claim 18 wherein, in the event the pressure in said communication chamber is less than a predetermined pressure, said control valve element opens communication between said communication chamber and said discharge chamber through said conduit means and said piston slides upward in said cylinder to open communication between said intermediate pressure chamber and said communication chamber to thereby decrease the compression ratio.*

*20. A scroll type compressor according to claim 19 wherein, in the event the pressure in said communication chamber is greater than the predetermined pressure, said control valve element closes off communication between said conduit means and said communication chamber and said piston slides downward in response to the pressure from said conduit means to close off communication between said intermediate pressure chamber and said communication chamber to thereby increase the compression ratio.*

* * * * *